United States Patent
Matusik et al.

(10) Patent No.: US 7,367,723 B2
(45) Date of Patent: May 6, 2008

(54) FAST SWITCHING CAMERA APERTURE

(75) Inventors: Wojciech Matusik, Cambridge, MA (US); William S. Yerazunis, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 455 days.

(21) Appl. No.: 11/193,752

(22) Filed: Jul. 29, 2005

(65) Prior Publication Data

US 2007/0025727 A1 Feb. 1, 2007

(51) Int. Cl.
*G03B 9/02* (2006.01)

(52) U.S. Cl. ............................. 396/505; 396/430

(58) Field of Classification Search ............... 396/430, 396/505
See application file for complete search history.

(56) References Cited

U.S. PATENT DOCUMENTS

2002/0131170 A1* 9/2002 Costales ..................... 359/464

OTHER PUBLICATIONS

Porter et al., "Compositing digital images," in Proceedings of the 11th annual conference on Computer graphics and interactive techniques, ACM Press, pp. 253-259, 1984.
Smith et al., "Blue screen matting," Proceedings of the 23rd annual conference on Computer graphics and interactive techniques, ACM Press, pp. 259-268.
Ruzon et al., "Alpha estimation in natural images," CVPR, vol. 1, pp. 18-25, 2000.
Hillman et al., "Alpha channel estimation in high resolution images and image sequences," Proceedings of IEEE CVPR 2001, IEEE Computer Society, vol. 1, pp. 1063-1068, 2001.
Chuang et al., "A bayesian approach to digital matting," Proceedings of IEEE CVPR 2001, IEEE Computer Society, vol. 2, pp. 264-271, 2001.
Chaung et al., "Video matting of complex scenes," ACM Trans. on Graphics 21, 3, pp. 243-248, Jul. 2002.
Sun et al, "Poisson matting," ACM Trans. on Graphics, Aug. 2004.
Zitnick et al., "High-quality video view interpolation using a layered representation," ACM Trans. on Graphics 23, 3, pp. 600-608, 2004.
Debevec et al., "A lighting reproduction approach to live action compositing," ACM Transactions on Graphics 21, 3, pp. 547-556, 2002.
Favaro et al., "Seeing beyond occlusions (and other marvels of a finite lens aperture)," Proc. of the IEEE Intl. Conf. on Computer Vision and Pattern Recognition, p. 579, 2003.
Schechner et al, "Separation of transparent layers using focus," International Journal of Computer Vision, pp. 25-39, 2000.
McGuire et al., "Defocus Video Matting," ACM Transactions on Graphics 24, 3, 2003.
Gortler et al., "The lumigraph," Proceedings of the 23rd annual conference on Computer graphics and interactive techniques, ACM Press, pp. 43-54, 1996.

* cited by examiner

*Primary Examiner*—W. B. Perkey
*Assistant Examiner*—Warren K Fenwick
(74) *Attorney, Agent, or Firm*—Dirk Brinkman; Clinton D. Mueller; Gene V. Vinokur (57) ABSTRACT

A camera aperture includes a first polarizer and a second polarizer with a polarization 90° with respect to the first polarizer. The second polarizer has a through hole at a center. A polarizing rotator is disposed between the first polarizer and the second polarizer. A size of the aperture is changed when a voltage is applied selectively to the polarizing rotator.

19 Claims, 11 Drawing Sheets

FAST SWITCHING CAMERA APERTURE

FIELD OF THE INVENTION

This invention relates generally to cameras, and more particularly to fast switching apertures.

BACKGROUND OF THE INVENTION

Matting and compositing are frequently used in image and video editing, 3D photography, and film production. Matting separates a foreground region from an input image by estimating a color F and an opacity α for each pixel in the image. Compositing uses the matte to blend the extracted foreground with a novel background to produce an output image representing a novel scene. The opacity α measures a 'coverage' of the foreground region, due to either partial spatial coverage or partial temporal coverage, i.e., motion blur. The set of all opacity values α is called the alpha matte, the alpha channel, or simply a matte.

The matting problem can be formulated as follows. An image of a foreground against an opaque black background in a scene is αF. An image of the background without the foreground is B. An alpha image, where each pixel represents a partial coverage of that pixel by the foreground, is α. The image α is essentially an image of the foreground object 'painted' white, evenly lit, and held against the opaque background. The scale and resolution of the foreground and background images can differ due to perspective foreshortening.

Figure 5:
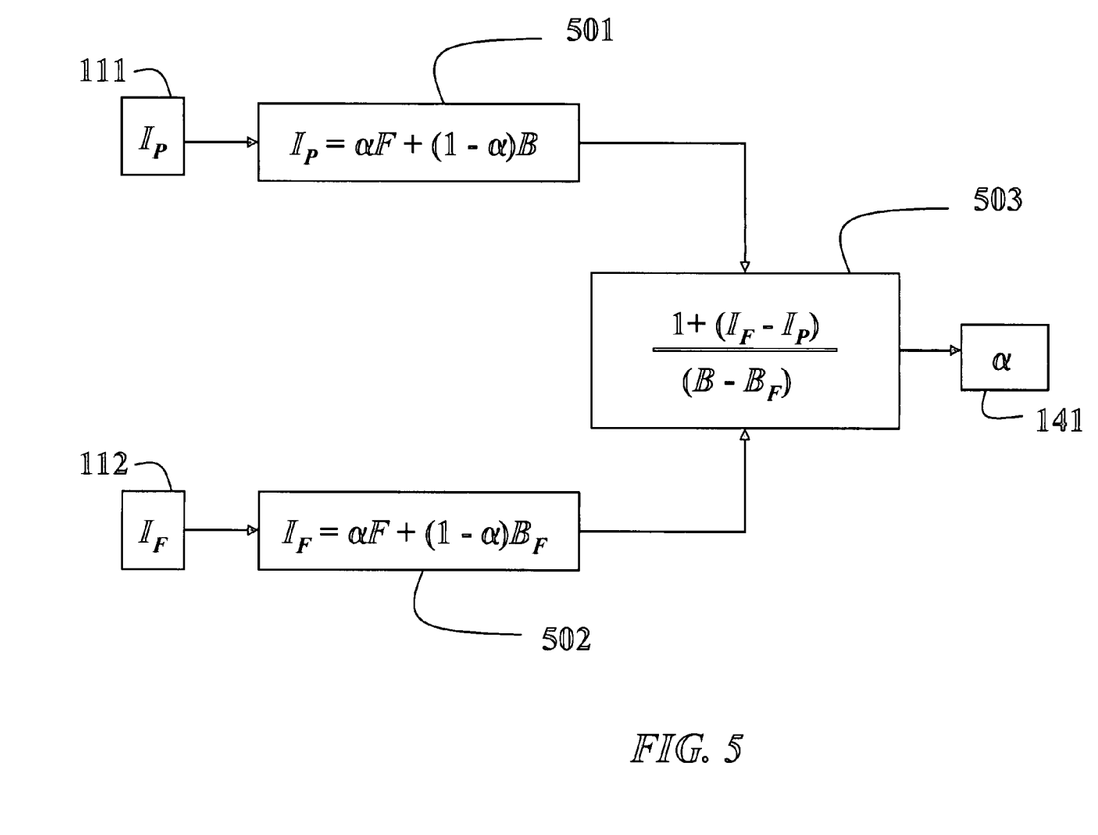
FIG. 5 is a block diagram of a method for extracting a matte according to one embodiment of the invention.

The notions of an alpha matte, pre-multiplied alpha, and the algebra of composition have been formalized by Porter et al., "Compositing digital images," in Proceedings of the 11$^{th}$ Annual Conference on Computer Graphics and Interactive Techniques, ACM Press, pp. 253-259, 1984. They showed that for a pinhole (narrow aperture) camera, the image αF in front of the background image B can be expressed 501 (see FIG. 5) by a linear interpolation:

$$I_P = \alpha F + (1-\alpha)B \quad (1)$$

where $I_P$ is a pinhole (narrow aperture) image, αF is the pre-multiplied image of the foreground against an opaque background, and B is the image of the opaque background in the absence of the foreground.

Matting is the inverse problem of solving for the unknown values of the variables (α, $F_r$, $F_g$, $F_b$, $B_r$, $B_g$, $B_b$), given the composite image pixel values ($I_{P_r}$, $I_{P_g}$, $I_{P_b}$), where r, g, and b are color channels. The 'P' subscript denotes that Equation (1) holds for a pinhole camera, i.e., where the entire scene is in focus. One can approximate a pinhole camera with a very narrow aperture. Blue screen matting is easier to solve because the background color B is known.

Matting is described generally by Smith et al., "Blue screen matting," Proceedings of the 23$^{rd}$ Annual Conference on Computer Graphics and Interactive Techniques, ACM Press, pp. 259-268; and U.S. Pat. No. 4,100,569, "Comprehensive electronic compositing system," issued to Vlahos on Jul. 11, 1978.

Conventional matting requires a background with known, constant color, which is referred to as blue screen matting. If a digital camera is used, then a green matte is preferred. Blue screen matting is the predominant technique in the film and broadcast industry. For example, broadcast studios use blue matting for presenting weather reports. The background is a blue screen, and the foreground region includes the weatherman standing in front of the blue screen. The foreground is extracted, and then superimposed onto a weather map so that it appears that the weatherman is actually standing in front of the map. However, blue screen matting is costly and not readily available to casual users. Even production studios would prefer a lower-cost and less intrusive alternative.

Ideally, one would like to extract a high-quality matte from an image or video with an arbitrary, i.e., unknown, background. This process is known as natural image matting. Recently, there has been substantial progress in this area, Ruzon et al., "Alpha estimation in natural images," CVPR, vol. 1, pp. 18-25, 2000; Hillman et al., "Alpha channel estimation in high resolution images and image sequences," Proceedings of IEEE CVPR 2001, IEEE Computer Society, vol. 1, pp. 1063-1068, 2001; Chuang et al., "A Bayesian approach to digital matting," Proceedings of IEEE CVPR 2001, IEEE Computer Society, vol. 2, pp. 264-271, 2001; Chuang et al., "Video matting of complex scenes," ACM Trans. on Graphics 21, 3, pp. 243-248, July, 2002; and Sun et al., "Poisson matting," ACM Trans. on Graphics, August 2004. Unfortunately, all of those methods require substantial manual intervention, which becomes prohibitive for long image sequences and for non-professional users. The difficulty arises because matting from a single image is fundamentally under-constrained.

It desired to perform matting using non-intrusive techniques. That is, the scene does not need to be modified. It is also desired to perform the matting automatically. Furthermore, it is desired to provide matting for 'rich' natural images, i.e., images with a lot of fine, detailed structure.

Most natural image matting methods require manually defined trimaps to determine the distribution of color in the foreground and background regions. A trimap segments an image into background, foreground and unknown pixels. Using the trimaps, those methods estimate likely values of the foreground and background colors of unknown pixels, and use the colors to solve the matting Equation (1).

Bayesian matting, and its extension to image sequences, produces the best results in many applications. However, those methods require manually defined trimaps for key frames. This is tedious for a long image sequences. It is desired to provide a method that does not require user intervention, and that can operate in real-time as an image sequence is acquired.

The prior art estimation of the color distributions works only when the foreground and background are sufficiently different in a neighborhood of an unknown pixel. Therefore, it is desired to provide a method that can extract a matte where the foreground and background pixels have substantially similar color distributions.

The Poisson matting of Sun et al. solves a Poisson equation for the matte by assuming that the foreground and background are slowly varying. Their method interacts closely with the user by beginning from a manually constructed trimap. They also provide 'painting' tools to correct errors in the matte.

An unassisted, natural video matting system is described by Zitnick et al., "High-quality video view interpolation using a layered representation," ACM Trans. on Graphics 23, 3, pp. 600-608, 2004. They acquire videos with a horizontal row of eight cameras spaced over about two meters. They measure depth discrepancies from stereo disparity using sophisticated region processing, and then construct a trimap from the depth discrepancies. The actual matting is determined by the Bayesian matting of Chuang et al. However, that method has the view dependent problems that are unavoidable with stereo cameras, e.g., reflections, specular highlights, and occlusions. It is desired to avoid view dependent problems.

Difference matting, also known as background subtraction, solves for α and the alpha-multiplied foreground αF, given background and trimap images, Qian et al., "Video background replacement without a blue screen," Proceedings of ICIP, vol. 4, 143-146, 1999. However, difference matting has limited discrimination at the borders of the foreground.

Another method uses back lighting to determine the matte. Back lighting is a common segmentation method used in many computer vision systems. Back lighting has also been used in image-based rendering systems, Debevec et al., "A lighting reproduction approach to live action compositing," ACM Transactions on Graphics 21, 3, pp. 547-556, 2002. That method has two drawbacks. First, active illumination is required, and second, incorrect results may be produced near object boundaries because some objects become highly reflective near grazing angles of the light.

Scene reconstruction is described by Favaro et al., "Seeing beyond occlusions (and other marvels of a finite lens aperture)," Proc. of the IEEE Intl. Conf. on Computer Vision and Pattern Recognition, p. 579, 2003. That method uses defocused images and gradient descent minimization of a sum-squared error. The method solves for coarse depth and a binary alpha.

Another method uses a depth-from-focus system to recover overlapping objects with fractional alphas, Schechner et al, "Separation of transparent layers using focus," International Journal of Computer Vision, pp. 25-39, 2000. They position a motorized CCD axially behind a lens to acquire images with slightly varying points of focus. Depth is recovered by selecting the image plane location that has the best focused image. That method is limited to static scenes.

Another method uses three video streams acquired by three cameras with different depth-of-field and focus and that share the same center of projection to extract mattes for scenes with unconstrained, dynamic backgrounds, McGuire et al., "Defocus Video Matting," ACM Transactions on Graphics 24, 3, 2003; and U.S. patent application Ser. No. 11/092,376, filed by McGuire et al. on Mar. 29, 2005, "System and Method for Image Matting."

SUMMARY OF THE INVENTION

Matting is a process for extracting a high-quality alpha matte and foreground from an image or a video. Conventional techniques require either a known background, e.g., a blue screen, or extensive manual interaction, e.g., manually specified foreground and background regions. Matting is generally under-constrained, because not enough information is obtained when the images are acquired.

One embodiment of the invention provides a system and method for extracting a matte automatically from a video. The video includes sets of pinhole (narrow aperture) images and wide apertures images (frames) that are produced either in parallel or in a time-interleaved manner.

The parallel sets of images can be acquired with a camera having two optical systems that have a common center of projection. One optical system has a large depth-of-field to acquire the pinhole images, while the other optical system has a small depth-of-field to acquire the wide apertures images.

A single camera can acquire the time-interleaved images using a fast switching aperture. The aperture includes polarizing elements that can rapidly switch between different aperture sizes. As an advantage, the aperture size is manipulated using optical techniques. Thus, the aperture does not require any moving parts, and can be switched at rates far exceeding mechanical apertures.

DETAILED DESCRIPTION OF THE PREFERRED EMBODIMENT

System Structure

Figure 1:
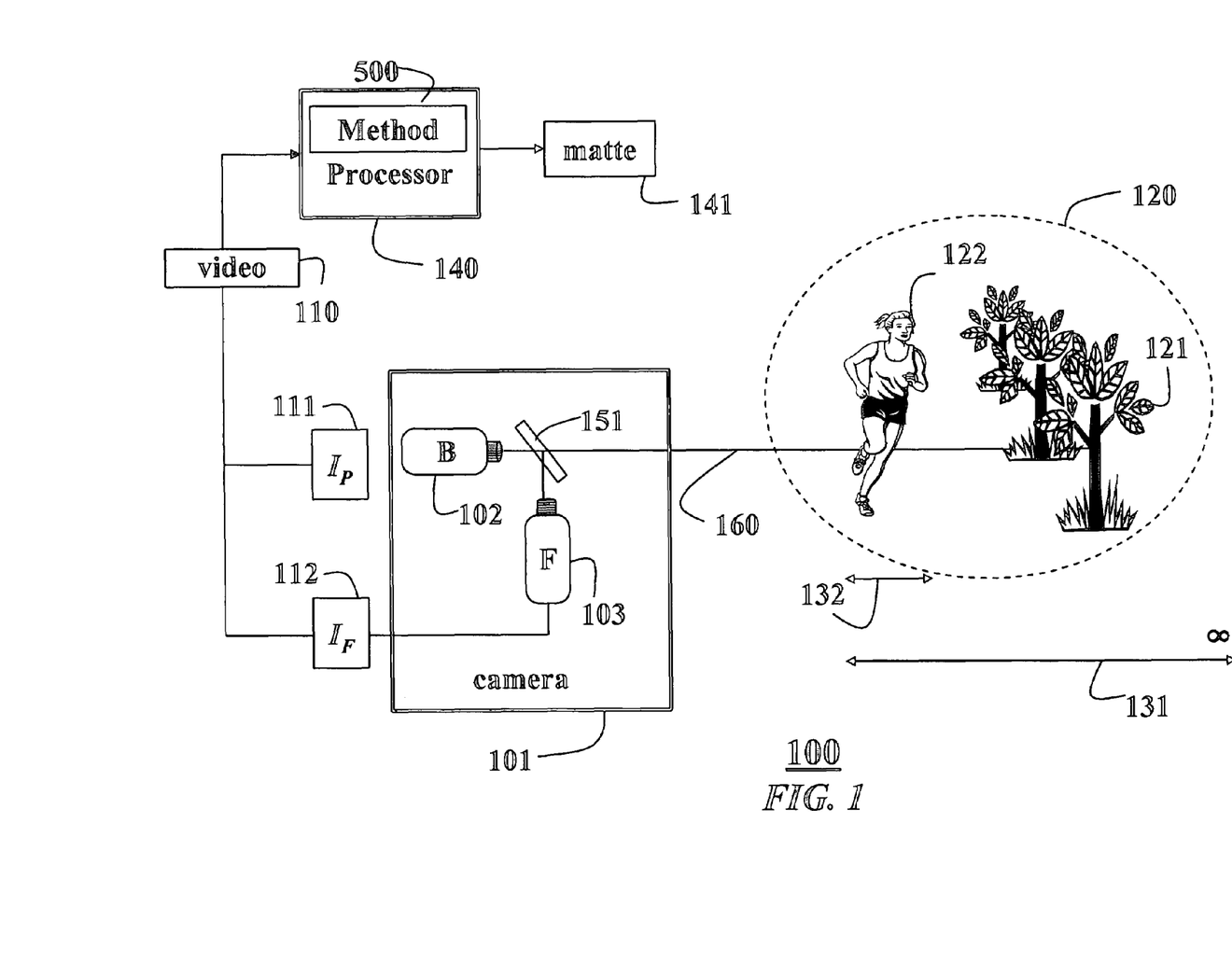
FIG. 1 is a block diagram of a method for extracting a matte from a video according to an embodiment of the invention.

FIG. 1 shows a system 100 and method 500 for automatically extracting a matte 141 from a video 110 acquired of a scene 120 according to an embodiment of our invention. The scene 120 includes a background (B) 121 and a foreground (F) 122. The scene can be a natural, real-world scene illuminated only by ambient light.

The video 110 is acquired by a camera 101 including a pinhole (narrow aperture) optical system 102 and a foreground optical system 103. The optical systems 102-103 have a single center of projection on an optical axis 160, and use a beam splitter 151. The optical systems are calibrated with respect to each other. The video 110 is provided to a processor 140 performing the method 500.

The video 110 includes sets of images 111-112 acquired parallel in time. The set of images $I_P$ 111 is acquired at a large depth-of-field 131, i.e., the images $I_P$ 111 are acquired with a very narrow aperture focused at the foreground. The images $I_P$ 111 can be approximated using a pinhole camera model, see Equation (1). A corresponding set of wide aperture mages $I_F$ 112 is acquired in parallel with a small depth-of-field 132 focused at the foreground.

Figure 2:
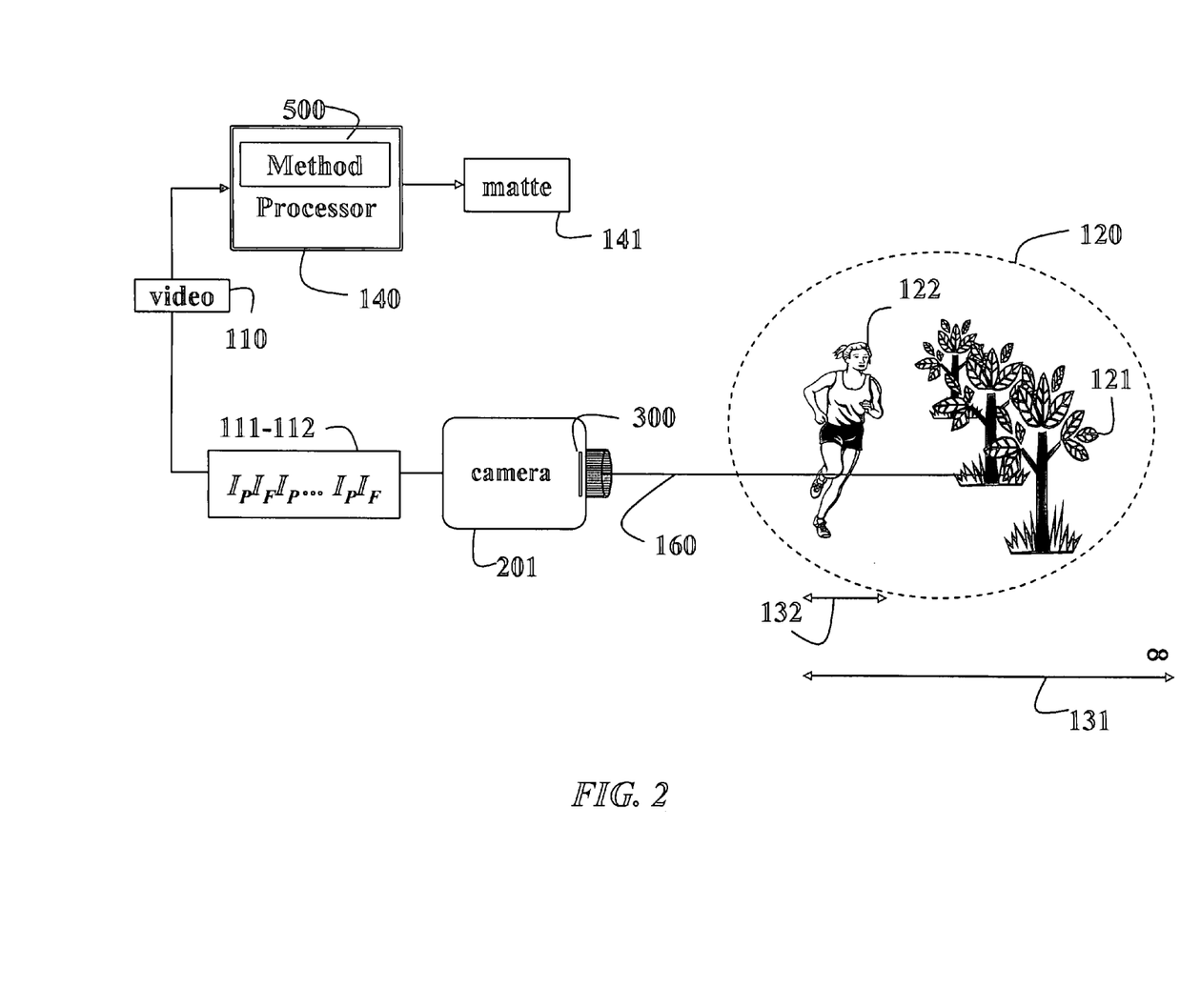
FIG. 2 is a block diagram of a method for extracting a matte from a video according to an embodiment of the invention.

FIG. 2 shows another embodiment of the invention. The camera 201 uses a single optical system, and the images $I_P$ and $I_F$ of the sets 111-112 are serially interleaved in time.

Because the images are interleaved in time, pairs of corresponding narrow aperture images $I_P$ and wide aperture images $I_F$ may not be registered when the scene 120 includes moving objects. In this case, a conventional optical flow process can be used to register the sets of images $I_P$ and $I_F$.

Camera Aperture

Figure 3A:
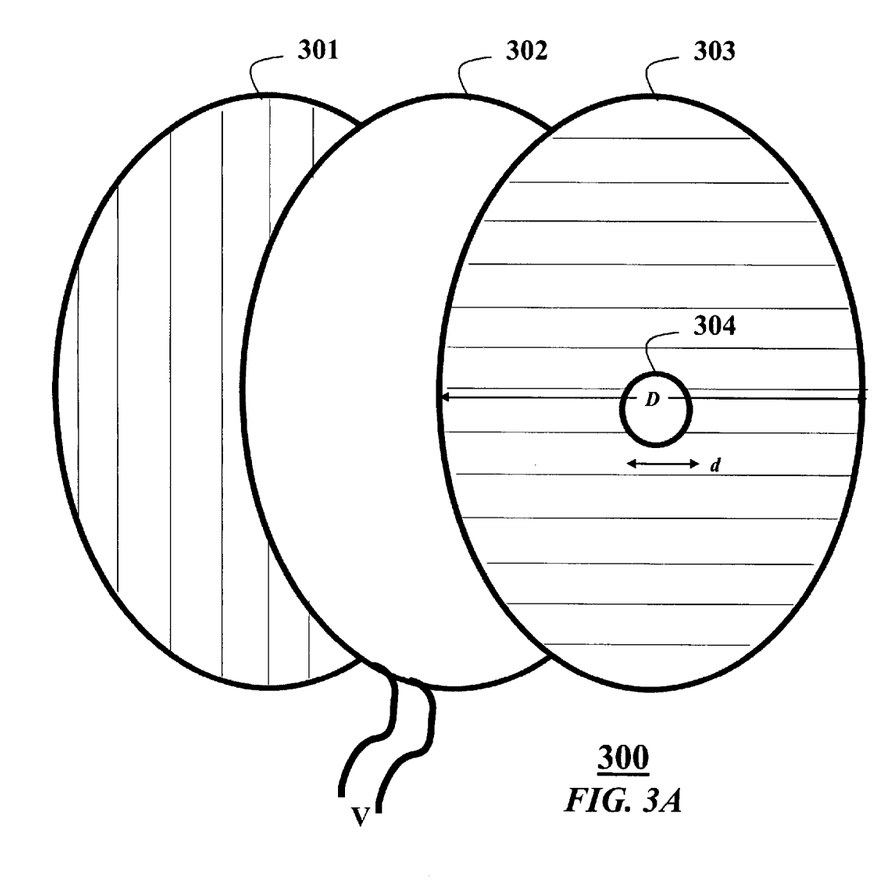
FIG. 3A is an exploded diagram of a camera aperture according to an embodiment of the invention.

Therefore, as shown in FIG. 3A, the camera 201 uses a fast switching aperture 300. Most conventional camera apertures use a mechanical shutter. The speed at which the mechanical shutter can open and close is limited by the weight of the leaves of the aperture and the strengths of the springs and actuators driving the leaves of the aperture. Even if the aperture mechanism were made very strongly, and driven with high-energy actuators, the resulting large mechanical motions would induce vibrations in the camera assembly blurring the image.

Most conventional camera apertures are mechanical, and include moving parts. There are two major problems with such apertures. First, the apertures are relatively slow to switch to different depths of field, and second, the rapid movement of the parts causes vibration in the camera body, which adds noise to the images, particularly if the imager is a CCD type of device. Therefore, it is desired to provide a fast switching camera aperture that operates on optical, and not mechanical, principals.

The aperture 300 can switch size at a frame rate of the camera 201 or higher, e.g., at a rate up to about 10 KHz. The aperture mechanism 300 includes two polarizers 301-303 having a first diameter D. The second polarizer 303 has a pinhole or narrow aperture (through hole) 304 having a second diameter d. The polarization of the polarizers 301-303 are rotated 90° with respect to each other, as shown. Therefore, light only passes through the pinhole 304.

A polarization rotator element 302, also having a diameter D, is disposed between the polarizers 301-303. The element 302 rotates the polarization of the light field passing though it by 90° when a voltage (V) is applied to the polarization rotator 302. For example, the element is a ferroelectric liquid crystal. Thus, when the voltage is applied to the element, the camera 201 has a large aperture diameter D because light passes though all three elements 301-303. Otherwise, absent the voltage, the light only passes through the pinhole 304 having an aperture diameter d. Commercial ferroelectric liquid crystal devices can switch from a zero-rotation state to a 90-degree rotation state in less than 10 microseconds with power inputs on the order of a few volts at a fraction of a milliamp. Other polarization rotators are possible to use. For example a Kerr cell can rotate polarization. Conventional nematic, supertwist liquid crystals can also rotate the polarization.

Figure 3B:
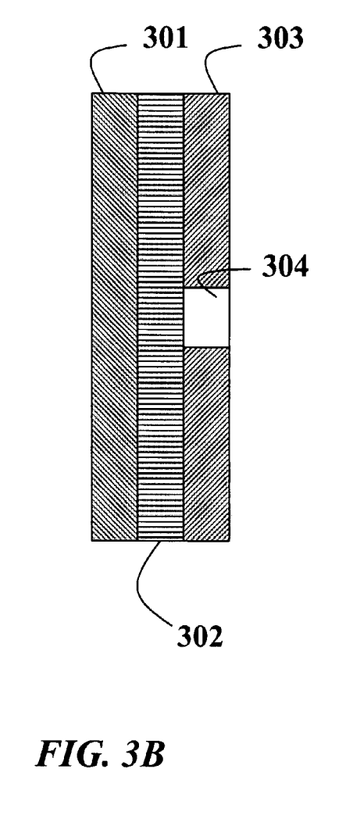
FIG. 3B is a side view of the camera aperture of FIG. 3A.

FIG. 3B is an end view of the aperture shown in FIG. 3A.

Figure 3C:
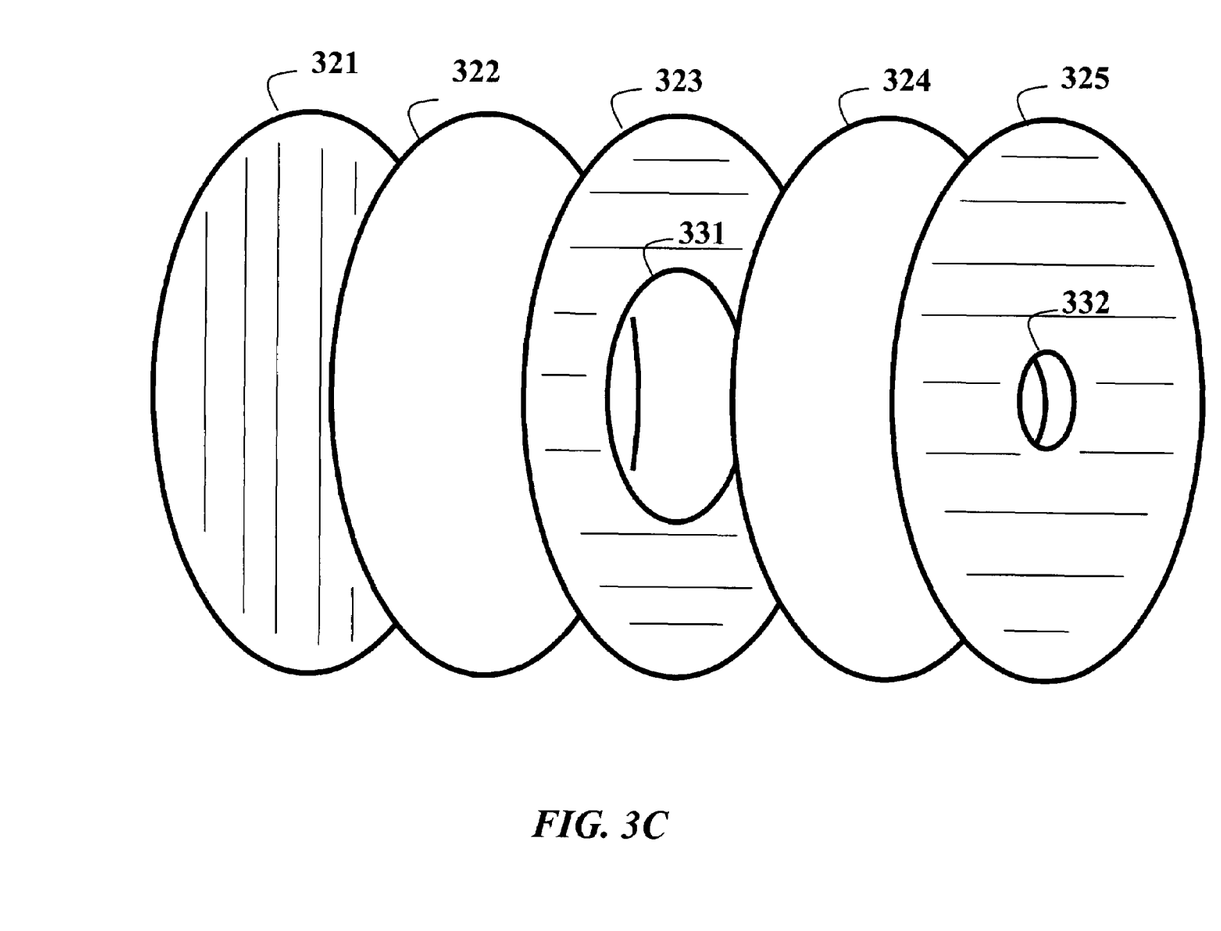
FIG. 3C is an exploded diagram of a camera aperture according to an embodiment of the invention.
Figure 3D:
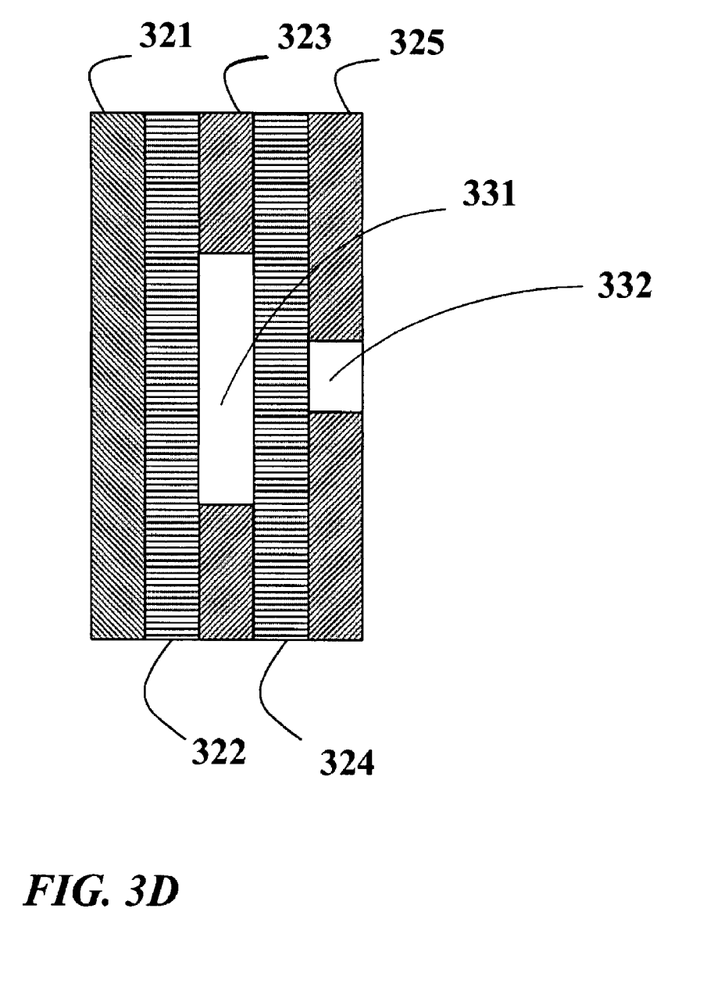
FIG. 3D is a side vide of the camera aperture of FIG. 3C.

FIGS. 3C and 3D show another embodiment with multiple aperture settings possible. This aperture includes polarizers 321, 323, 325, and polarization rotators 322 and 324. Two though holes 331-332 are shown to provide three aperture settings. It should be understood that any number of fast switching aperture settings can be provided in this manner. The sizes of the apertures decrease in a direction of the light field passing through the aperture.

Figure 3E:
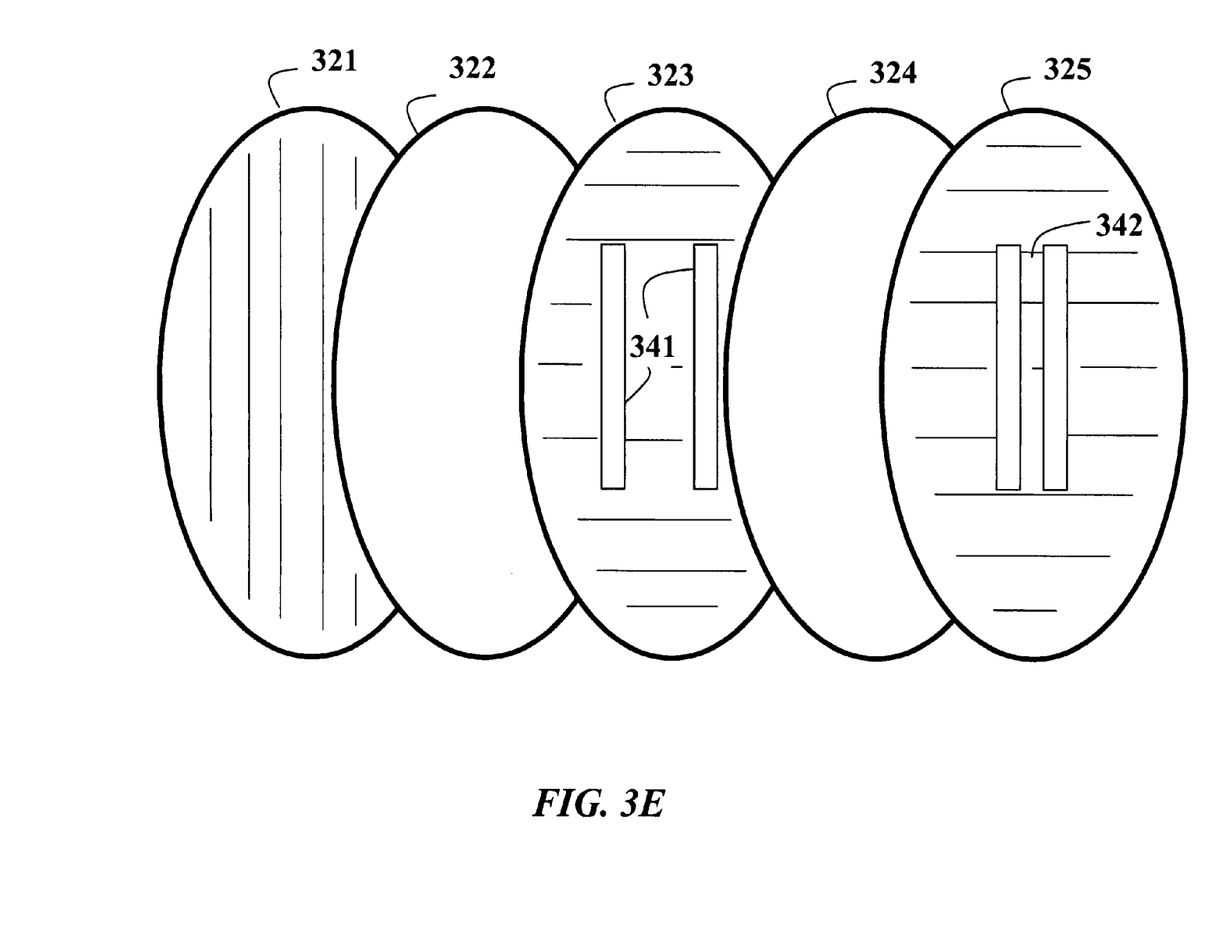
FIG. 3E is an exploded view of a camera aperture in the form of slits.
Figure 3F:
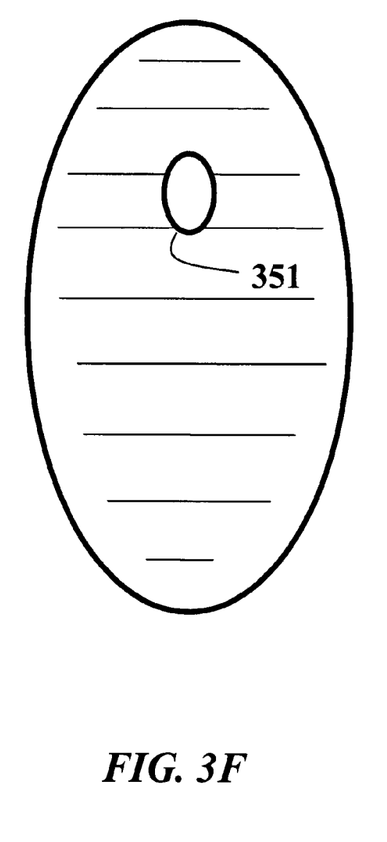
FIG. 3F is a view of an aperture offset from the optical axis.
Figure 3G:
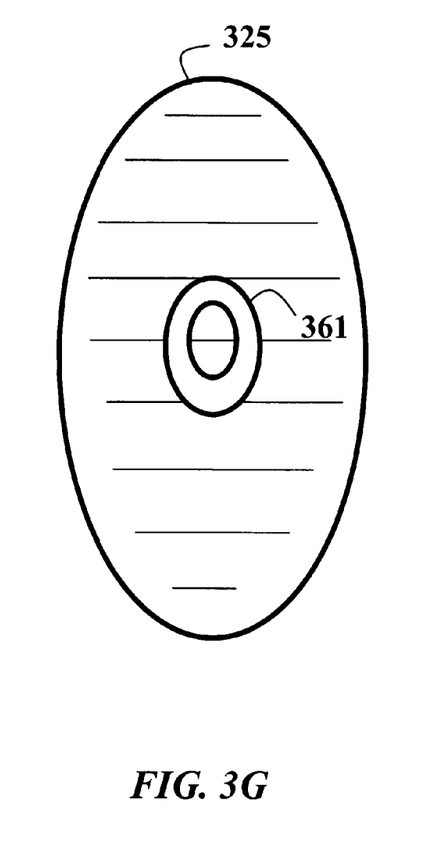
FIG. 3G is a view of a camera aperture in the form of a torus.

FIG. 3E shows a configuration where the through holes are slits 341-342 spaced apart at varying distances. This can be used to separate low (DC) and high (AC) frequency components in a light field. FIG. 3F shows an embodiment where the one or more through holes 351 are offset from the center (optical axis). FIG. 3G show an embodiment where the through hole 461 is a torus.

It should be noted, that if multiple through holes are used, it is actually possible to move the aperture along the optical axis, effectively changing the focal plane. This is not possible with mechanical apertures.

It should also be noted that various combinations of different through holes with differences in size, shape and offset from the optical axis can be used.

Method Operation

When the images are acquired according to the embodiments of the invention, then the following expression 502 (see FIG. 5) approximates the wide aperture images $I_F$ 112:

$$I_F = \alpha F + (1-\alpha) B_F, \quad (2)$$

where $$B_F = B h_B, \quad (3)$$

and $h_B$ is a point spread function (PSF).

Given a known background, we can directly solve for $\alpha$. Although we begin with a known background, we avoid many of the drawbacks of difference matting by using two sets of images: the pinhole images 111 and the wide aperture images 112.

From Equations (1) and (2), we obtain an expression 503 for $\alpha$ 141:

$$\alpha = C + (I_F - I_P)/(B - B_F), \quad (4)$$

where C is a constant, e.g., 1.

FIG. 5 shows the steps of the basic method.

To produce better results, we use:

$$\alpha = (B - B_F + I_F - I_P)/(B - B_F). \quad (5)$$

If color images are used, then B, $B_F$, $I_P$, and $I_F$ are vectors. Thus, the expression for $\alpha$ is $$\alpha = (\|B - B_F + I_F - I_P\|)/(\|B - B_F\|), \quad (6)$$

where $\|\cdot\|$ is a length operator for color vectors.

Given $\alpha$, we can determine $\alpha F$ using:

$$\alpha F = I_F + (\alpha - 1) B_F \quad (7)$$

or $$\alpha F = I_P + (\alpha - 1) B \quad (8)$$

or $$\alpha F = 0.5 \times (I_F + I_P + (\alpha - 1)(B_F + B)). \quad (9)$$

However, the $\alpha$ expression can be ill-conditioned when $B = B_F$. Therefore, alpha values for these pixels can not be determined reliably.

There are two possible solutions to this problem. A known background pattern can be used to guarantee that $\|B - B_F\|$ is substantially larger than zero, see below. Alternatively, alpha values can be interpolated from the neighboring pixels. One can either use a threshold for the denominator $\|B - B_F\|$ with the alpha values being interpolated from the neighbors when the denominator is less than a threshold, or one can use a confidence map for the value of the denominator. In this context, it is possible to use known scattered data interpolation methods, e.g., push-pull as described by Gortler et al., "The lumigraph," Proceedings of the 23rd annual conference on Computer graphics and interactive techniques, ACM Press, pp. 43-54, 1996, incorporated herein by reference.

Matte Background Pattern

In many applications, it is necessary to guarantee perfect matting results. In this setting, any type of incorrect matting and compositing is simply not acceptable. In such applications, the background can be illuminated using a projector, or the background can include a known pattern so that the expression used to determine $\alpha$ is well-conditioned.

According to Equation (6), the denominator $\|B-B_F\|$ determines the precision of $\alpha$. The background can have values from $B_{min}$ to $B_{max}$. The image $B_F$ is a low-pass version of the background. An optimal low-pass (average) value of the background is:

$$B_F = 0.5 \times (B_{min} + B_{max}). \qquad (10)$$

Optimal values for B are $B_{min}$ and $B_{max}$. Thus, the value of the denominator is always $0.5 \times (B_{max} - B_{min})$. In the best case, when $B_{min} = 0$, the denominator is reduced to $0.5 \times B_{max}$ and one bit of alpha precision is lost, e.g., if $B_{max}$ is an 8 bit value, then the maximum precision of alpha is 7 bits.

There are many background patterns that give these optimal results. Here, we described an example background. If the PSF $h_B$ is rotationally symmetric, then the pattern can be specified in 1D. Next, we determine allowed frequencies of the pattern.

If the size of the PSF $h_B$ is k pixels, then the minimum frequency of the pattern is k×0.5 pixels. If the large depth-of-field pixels are aligned with the pattern, then the maximum frequency of the pattern is one pixel. In cases of higher frequencies, different patterns values are averaged. The use of color improves the conditioning of the problem when the pixels are misaligned with pattern transitions. It is desired to shift the pattern for different colors such that the value of the denominator is always large for at least one color.

Figure 4:
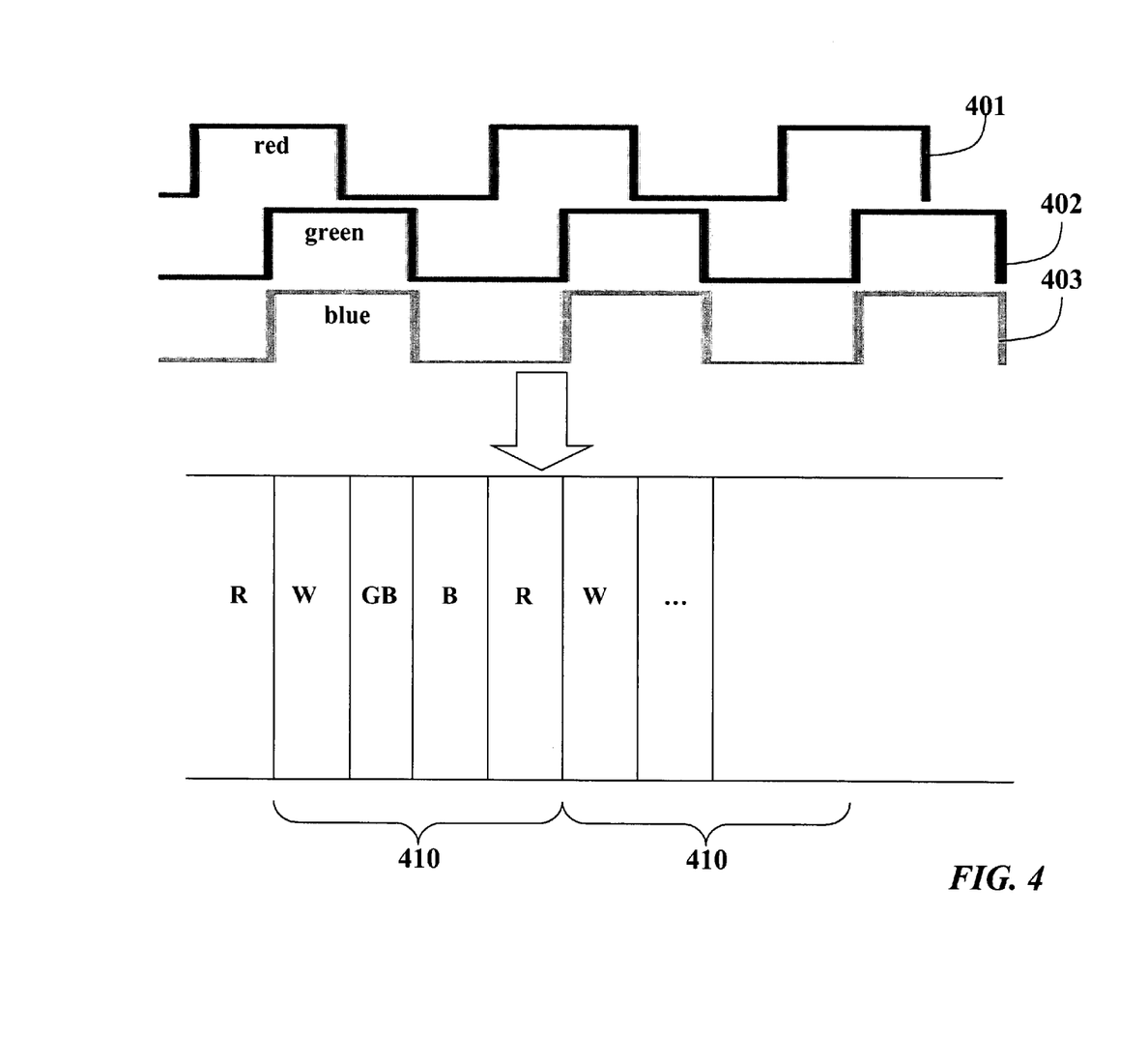
FIG. 4 is a diagram of a high frequency background pattern according to an embodiment of the invention.

For example, as shown in FIG. 4, a pattern in one dimension for the color red 401 is shifted by ¼ in front of the pattern period with respect to the pattern 402 for the blue color and the pattern 403 for the green color. When the above patterns are superimposed and printed or projected onto a white surface in 2D, repeated vertical bars 410 of the colors red, white, green/blue, and black are produced to produce the desired high frequency background pattern. In an actual implementation, the bars are about 2-3 millimeters wide. It should be understood that the pattern can easily be printed on wallpaper for covering an entire sound stage.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A camera aperture, comprising:
   a first polarizer with a first polarization;
   a second polarizer with a second polarization offset by 90° from the first polarization, the second polarizer having a through hole; and
   a polarizing rotator disposed between the first polarizer and the second polarizer.

2. The camera aperture of claim 1, further comprising:
   means for applying a voltage to the polarizing rotator.

3. The camera aperture of claim 1, further comprising:
   means for selectively applying a voltage to the polarizing rotator.

4. The camera aperture of claim 3, in which the means for selectively applying a voltage can change an effective size of the camera aperture up to a rate of 100 KHz.

5. The camera aperture of claim 1, in which the polarizing rotator is a ferroelectric liquid crystal.

6. The camera aperture of claim 1, in which the polarizing rotator is a Kerr cell.

7. The camera aperture of claim 1, in which the polarizing rotator is a nematic liquid crystal.

8. The camera aperture of claim 1, in which the polarizing rotator is a supertwist liquid crystal.

9. The camera aperture of claim 1, in which the through hole is at a center of the polarizing rotator.

10. The camera aperture of claim 1, in which the first polarizer, the second polarizer, and the polarizing rotator are circular disks.

11. A camera aperture, comprising:
    a set of polarizers, all but one of the polarizers having a through hole, in which a polarization of all polarizers having a through hole is offset by 90° from the polarization of the one polarizer without the through hole; and
    a set of polarizing rotators disposed between each pair of polarizers.

12. The camera aperture of claim 11, further comprising:
    means for selectively applying voltages to the set of polarizing rotators.

13. The camera aperture of claim 11, in which the through holes are arranged in a decreasing size in a direction of a light field passing through the camera aperture.

14. The camera aperture of claim 11, in which selected ones of the set of through holes are centered on an optical axis of the camera aperture.

15. The camera aperture of claim 11, in which selected ones of the set of through holes are offset from an optical axis of the camera aperture.

16. The camera aperture of claim 11, in which selected ones of the through holes are in a form of slits.

17. The camera aperture of claim 11, in which selected ones of the through holes are in a form of a torus.

18. A method for switching camera aperture sizes, comprising the steps of:
    passing a light field through a first polarizer with a first polarization; and then
    passing the light field through a polarizing rotator while selectively applying a voltage to the polarizing rotator; and then
    passing the light field through a second polarizer with a second polarization offset by 90° from the first polarization of the first polarizer, the second polarizer having a through hole.

19. A method for switching camera aperture sizes, comprising steps of:
    passing a light field through a set of polarizers, all but one of the polarizers having a through hole, in which a polarization of all polarizers having a through hole is offset by 90° from the polarization of the one polarizer without the through hole; and
    passing the light field through a set of polarizing rotators, each polarizing rotator disposed between each pair of the polarizers while selectively applying voltages to the polarizing rotators.

* * * * *